United States Patent
Ledieu

(10) Patent No.: US 12,294,284 B2
(45) Date of Patent: May 6, 2025

(54) ELECTRIC MOTOR AND DRIVE SYSTEM FOR HEAT TRANSFER

(71) Applicant: NOVARES FRANCE, Clamart (FR)

(72) Inventor: Cédric Ledieu, Mont Saint Eloi (FR)

(73) Assignee: NOVARES France, Clamart (FR)

( * ) Notice: Subject to any disclaimer, the term of this patent is extended or adjusted under 35 U.S.C. 154(b) by 235 days.

(21) Appl. No.: 18/017,721

(22) PCT Filed: Jul. 23, 2021

(86) PCT No.: PCT/FR2021/051389
§ 371 (c)(1),
(2) Date: Jan. 24, 2023

(87) PCT Pub. No.: WO2022/018391
PCT Pub. Date: Jan. 27, 2022

(65) Prior Publication Data
US 2023/0268804 A1 Aug. 24, 2023

(30) Foreign Application Priority Data

Jul. 24, 2020 (FR) .................................... 20/07808

(51) Int. Cl.
*H02K 9/193* (2006.01)
*H02K 5/15* (2006.01)
(Continued)

(52) U.S. Cl.
CPC .............. *H02K 9/193* (2013.01); *H02K 5/15* (2013.01); *H02K 7/083* (2013.01); *H02K 11/25* (2016.01)

(58) Field of Classification Search
CPC .......... H02K 9/193; H02K 11/25; H02K 5/15; H02K 7/083
(Continued)

(56) References Cited

U.S. PATENT DOCUMENTS

| 7,239,032 B1* | 7/2007 | Wilson .................... F02N 11/04 |
| | | 290/31 |
| 2014/0265659 A1* | 9/2014 | Chamberlin ......... H02K 5/1732 |
| | | 310/54 |
| 2018/0170169 A1 | 6/2018 | Lee et al. |

FOREIGN PATENT DOCUMENTS

| DE | 102014223875 A1 | 5/2016 |
| FR | 2756116 A1 | 5/1998 |

(Continued)

OTHER PUBLICATIONS

International Search Report (English) dated Nov. 5, 2021; International Application No. PCT/FR2021/051389, Filed Jul. 23, 2021; 2 pages.

(Continued)

*Primary Examiner* — Jose A Gonzalez Quinones
(74) *Attorney, Agent, or Firm* — Burris Law, PLLC

(57) ABSTRACT

Electric motor including:
  a rotor whose rotating shaft extends along an axis of extension,
  a stator disposed around the rotor,
  a front bearing and a rear bearing configured to be assembled by forming an internal cavity in which the rotor and the stator are housed, the front bearing comprising a cylindrical portion extending along the axis of extension, and
  a lid having bell shape that completely covers the rear bearing and at least the cylindrical portion of the front bearing, the lid comprising an internal chamber which extends at least partly around the internal cavity, a heat-transfer fluid inlet and a heat-transfer fluid outlet fluidly connected to the internal chamber so as to allow a heat-transfer fluid to circulate in the internal chamber.

6 Claims, 3 Drawing Sheets

(51) Int. Cl.
*H02K 7/08* (2006.01)
*H02K 11/25* (2016.01)

(58) Field of Classification Search
USPC .......................................... 310/52–54, 58–59
See application file for complete search history.

(56) References Cited

FOREIGN PATENT DOCUMENTS

| | | | | |
|---|---|---|---|---|
| JP | 2004248402 A | * | 9/2004 | ......... F16H 57/0415 |
| JP | 5075872 B2 | * | 11/2012 | |
| WO | 2020126619 A1 | | 6/2020 | |

OTHER PUBLICATIONS

International Search Report (Non-English) dated Nov. 5, 2021; International Application No. PCT/FR2021/051389, Filed Jul. 23, 2021; 4 pages.
Written Opinion (Non-English) dated Nov. 5, 2021; International Application No. PCT/FR2021/051389, Filed Jul. 23, 2021; 8 pages.
Written Opinion (English) dated Nov. 5, 2021; International Application No. PCT/FR2021/051389, Filed Jul. 23, 2021; 8 pages.

* cited by examiner

[Fig. 1]
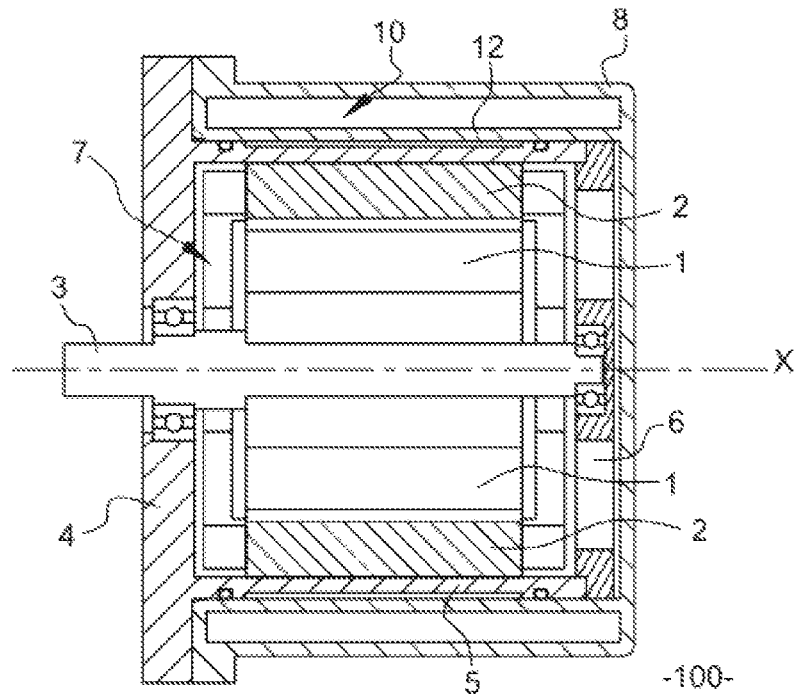
[Fig. 2]
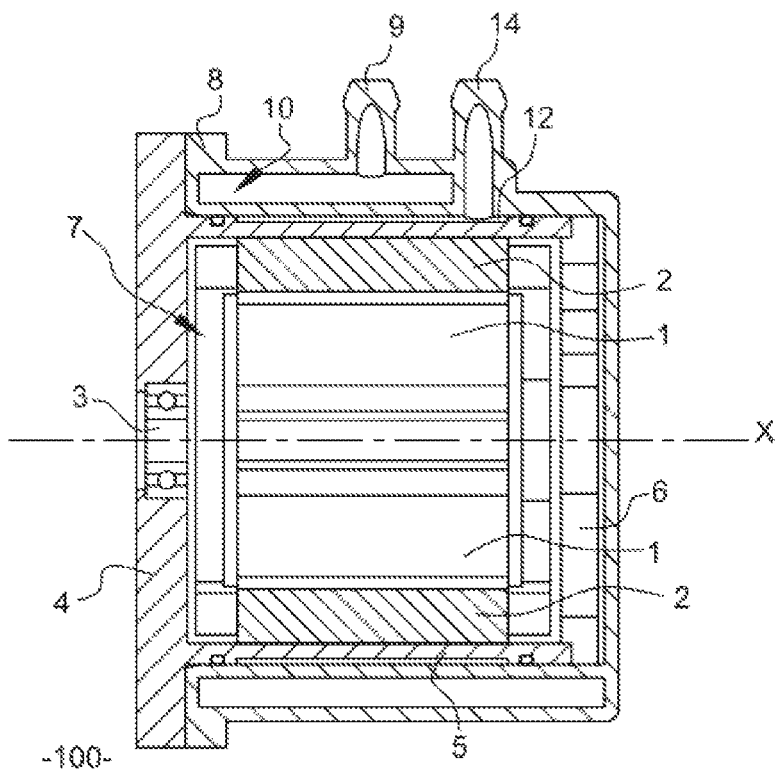

[Fig. 3]
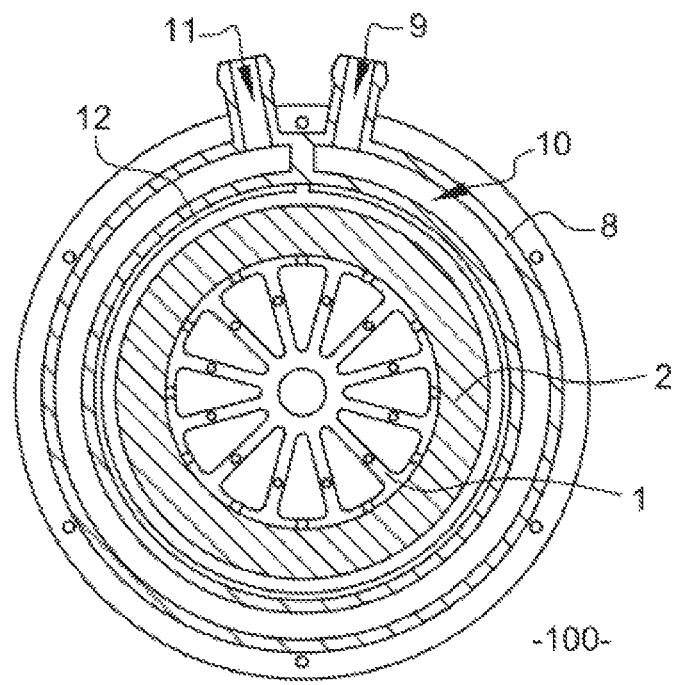
[Fig. 4]
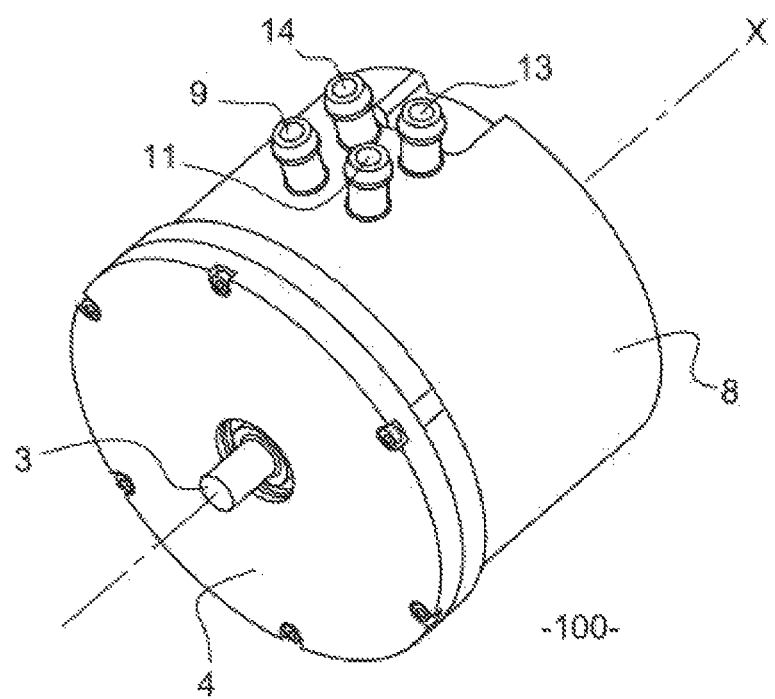

[Fig. 5]
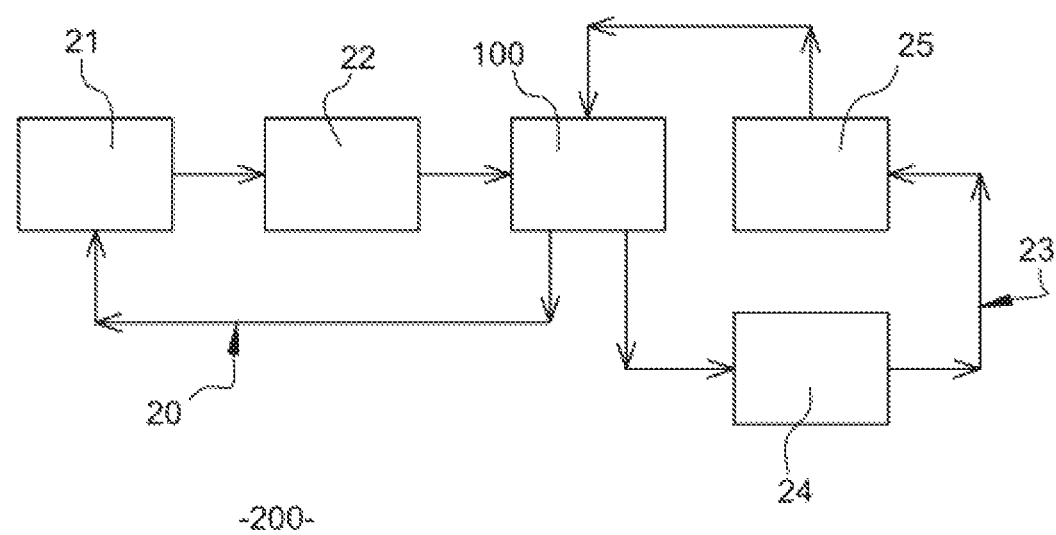

ELECTRIC MOTOR AND DRIVE SYSTEM FOR HEAT TRANSFER

CROSS REFERENCE TO RELATED APPLICATIONS

This application is a National Stage of PCT Application No. PCT/FR2021/051389 filed on Jul. 23, 2021, which claims priority to French Patent Application No. 20/07808 filed on Jul. 24, 2020, the contents each of which are incorporated herein by reference thereto.

TECHNICAL FIELD

The invention concerns an electric motor arranged to allow heat exchange with a heat-transfer fluid. According to another aspect, the invention concerns a drive system comprising a circuit for circulating a heat-transfer fluid with a view to transferring heat from an electric motor to a heat engine or to batteries.

BACKGROUND

Due to increasingly strict particulate emission control values, the control of emissions from internal combustion engines is of great importance and more and more use is made of hybridization by coupling the heat engine to an electric motor. However, there is a significant need to cool electric motors. Indeed, in general, current electric motors include a rotor secured to a shaft and a stator which surrounds the rotor. The stator is mounted in a crankcase which includes bearings for the rotational mounting of the shaft. The crankcase generally includes front and rear bearings assembled together. The bearings define an internal cavity in which the rotor and stator are housed. In general, each of the bearings centrally carries a ball bearing for the rotational mounting of the rotor shaft.

During operation of the electric motor, the current flowing through the phase windings of the stator generates significant heat that must be removed.

BRIEF SUMMARY

One amongst the objects of the invention consists in solving at least one of the problems.

To this end, the invention concerns an electric motor comprising:
  a rotor whose rotating shaft extends along an axis of extension X,
  a stator disposed around the rotor,
  a front bearing and a rear bearing configured to be assembled by forming an internal cavity in which the rotor and the stator are housed, the front bearing comprising a cylindrical portion extending along the axis of extension X, and
  a lid having a bell shape that completely covers the rear bearing and at least the cylindrical portion of the front bearing, the lid comprising an internal chamber which extends at least partly around the internal cavity, a heat-transfer fluid inlet and a heat-transfer fluid outlet fluidly connected to the internal chamber so as to allow circulation of a heat-transfer fluid in the internal chamber.

Configured in this manner, the electric motor of the invention allows more efficient cooling of the electric motor than in the prior art.

Indeed, the circulation of a heat-transfer fluid in an internal chamber disposed at least in part around the front bearing, which is in direct contact with the heat generating elements of the electric motor allows a heat exchange, which effectively cools the stator.

In addition, the present invention makes it possible to transfer heat energy to a heat-transfer fluid, which may in turn be used for heat transfer with an element external to the electric motor such as a cold heat engine, a thermal capacitor, or a battery, etc.

By the expression the "lid comprising an internal chamber", it should be understood in this document that the internal chamber is present in the thickness of the lid.

Advantageously, the lid according to the invention is configured to form with the cylindrical portion at least one internal channel extending at least partly around the internal cavity and configured for the circulation of a refrigerant liquid. Thus configured, the electric motor comprises a combination of two effective elements to improve the cooling of the front bearing and therefore of the electric motor in operation.

According to other features, the electric motor of the invention includes one or several of the following optional features considered alone or in combination:
  The refrigerant liquid is chosen from glycol and an oil.
  The lid is made of plastic material.
  The lid is separated from the part of the front bearing extending axially by sealing elements.
  The sealing elements consist of annular gaskets housed at least partially inside annular grooves formed on the periphery of the portion of the front bearing extending axially.
  The lid comprises a refrigerant fluid inlet pipe and a refrigerant liquid outlet pipe fluidly connected to the internal channel so as to allow circulation of a refrigerant liquid in the internal channel.
  The internal channel has a substantially cylindrical shape.
  The internal channel is annular.
  The longitudinal axis of the internal channel extends coaxially with the axis of extension X.
  The front and rear bearings are made of metal.
  The front bearing is made of aluminium.
  The rear bearing is made of steel.
  The fastening means are screws.
  The heat-transfer fluid is a lubricating oil, such as a heat engine oil or gearbox oil.
  The internal chamber is cylindrical.
  The internal chamber is annular.
  The internal chamber extends coaxially to the axis of extension X.
  The internal chamber and the internal channel are coaxial.
  The internal chamber surrounds the internal channel.
  The lid comprises an annular internal wall and an annular external wall which extends around the annular internal wall, the internal chamber being delimited internally and externally respectively by the annular internal wall and the annular external wall.

According to a second aspect, the invention suggests a drive system comprising a circulation circuit for heat-transfer fluid comprising successively:
  a heat engine,
  a first pump, and
  an electric motor as previously described,
fluidly connected in series, the first pump being configured to cause the circulation of the heat-transfer fluid in the circulation circuit from the internal chamber of the electric motor to the heat engine so as to perform heat transfer from the electric motor to the heat engine in order to transfer heat energy from the electric motor to the heat engine using the heat-transfer fluid.

In this drive system, during operation of the electric motor, the heat-transfer fluid circulating in the internal chamber makes it possible to cool the electric motor by heat exchange. The temperature of the heat-transfer fluid increases and makes it possible to transfer the stored heat in order to use this warmer heat-transfer fluid for the operation of the heat engine, in particular before it is started or during its cold start phase. This makes it possible to limit the duration of the engine starting phase during which the temperature of the engine lubricating oil is lower than the optimum operating temperature. This is particularly beneficial for reducing the emissions of polluting particles which are increased in the start phase of the engine due to its operation at a temperature lower than that allowing it to operate optimally. During this phase, the lubricating oil which is at this same temperature prevents it from having the optimum fluidity for the lubrication of the moving parts of the engine. Thus, the invention ensures better fluidity of the lubricating oil, which guarantees better engine performance and therefore makes it possible to reduce $CO_2$ emissions.

Advantageously, the drive system comprises a temperature sensor configured to measure the temperature of the heat-transfer fluid at the inlet of the heat engine, and the first pump comprises a controller configured to communicate with the temperature sensor, and pilot:

the starting of the first pump so as to cause the circulation of the heat-transfer fluid in the internal chamber when the temperature of the heat-transfer fluid measured by the temperature sensor is lower than a predetermined threshold temperature value so as to heat the heat engine, and the stopping of the first pump so as to stop the circulation of the heat-transfer fluid in the internal chamber when the temperature of the heat-transfer fluid measured by the temperature sensor is greater than a predetermined threshold temperature value.

It is understood that stopping the first pump causes the circulation of the heat-transfer fluid to stop in the heat engine.

The predetermined threshold temperature is set by the maximum temperature that the cooling liquid can reach when the electric motor is operating. Beyond this maximum temperature, the heat-transfer fluid would heat up the electric motor, which would be contrary to the intended purpose.

The predetermined threshold temperature is set between 70 and 90 degrees when the refrigerant liquid is glycol.

Configured in this manner, the drive system allows the application of the standards prescribed so far, which stipulate that the lubricating oil of the heat engine might be placed above a determined temperature, beyond the ambient temperature before its use to reduce the amount of $CO_2$ produced. Thus, the electric motor in operation heats the heat-transfer fluid circulating in the internal chamber and this heated heat-transfer fluid then circulates in the heat engine. Once the determined temperature has been reached, the heat engine may be started and the connection with the electric motor may be disconnected, the electric motor continues to operate in boost, alternator, and regenerative braking mode or even in 4×4 mode.

This heating of the heat-transfer fluid before starting the heat engine also makes it possible to immediately reach the optimum operating phase of the heat engine.

Preferably, the drive system comprises a refrigerant circuit for the circulation of a refrigerant liquid including successively:

an electric motor as previously described
a second pump, and
a heat exchanger configured to cool a refrigerant fluid, fluidly connected in series, the second pump being configured to cause the circulation of the refrigerant liquid in the refrigerant circuit from the heat exchanger to the internal channel in order to cool the electric motor.

Thanks to this arrangement, the temperature of the refrigerant liquid is maintained below a threshold temperature allowing the cooling of the electric motor. Advantageously, the refrigerant circuit and the circuit for circulating the heat-transfer fluid are configured so that the direction of circulation of the refrigerant liquid is opposite to the circulation direction of the heat-transfer fluid.

According to a particular arrangement, the heat-transfer fluid inlet is disposed opposite the refrigerant fluid outlet pipe and the heat-transfer fluid outlet is placed opposite the refrigerant fluid inlet pipe. This configuration makes it possible to optimize the heat exchange between the electric motor and the heat-transfer fluid.

According to other features, the electric motor of the invention includes one or several of the following optional features considered alone or in combination:

The first pump is an electric pump
The second pump is an electric pump.

BRIEF DESCRIPTION OF THE DRAWINGS

The invention will be better understood on reading the following non-limiting description, made with reference to the appended figures.

FIG. 1 is a longitudinal section view of an electric motor according to a particular embodiment of the invention, FIG. 2 is a longitudinal section view of the electric motor of FIG. 1.

FIG. 3 is a cross-sectional view of the electric motor of FIG. 1.

FIG. 4 is a perspective view of the electric motor of FIG. 1.

FIG. 5 is a schematic view of a drive system comprising the electric motor of FIG. 1 and a heat engine.

DETAILED DESCRIPTION

As illustrated in FIGS. 1 to 3, the electric motor 100 of the invention comprises a rotor 1 whose rotation shaft 3 extends along an axis of extension X and a stator 2 disposed around the rotor 1. It also comprises a front bearing 4 comprising a cylindrical portion 5 extending along the axis of extension X and a rear bearing 6, having the overall shape of a disc, assembled together to form an internal cavity 7 allowing to house the rotor 1 and the stator 2. According to an arrangement not visible in the Figures, the front bearing 4 is made of aluminum and the rear bearing 6 is made of steel.

The electric motor 100 further comprises a lid 8 having a bell shape, made of plastic material. The lid 8 covers the entire rear bearing 6 and at least the cylindrical portion 5 of the front bearing 4 (illustrated in FIGS. 1 to 4). The lid 8 comprises an internal chamber 10 which extends around the internal cavity 7. The lid 8 is provided with a heat-transfer fluid inlet 9 and a heat-transfer fluid outlet 11 fluidly connected to the internal chamber 10 so as to a allow circulation of a heat-transfer fluid in the internal chamber 10 (illustrated in FIGS. 2 and 3).

According to an arrangement represented in FIGS. 1 to 3, the lid 8 is configured to form with the cylindrical portion 5 of the front bearing 4 an internal channel 12 extending at least partly around the internal cavity 7. The lid 8 also comprises a refrigerant liquid inlet pipe 13 and a refrigerant liquid outlet pipe 14 fluidly connected to the internal channel 12. Thus, the lid 8 is configured for the circulation of a refrigerant liquid in the internal channel 12, allowing the cooling of the internal cavity 7 and of the stator 2.

As visible in FIGS. 1 and 2, the internal channel 12 has a substantially cylindrical shape whose longitudinal axis extends coaxially to the axis of extension X as well as the internal chamber 10 which is cylindrical. The internal chamber 10 and the internal channel 12 are coaxial, the internal chamber 10 surrounding the internal channel 12 so as to facilitate thermal exchange.

FIG. 5 illustrates another aspect of the invention relating to a drive system 200 comprising a circulation circuit 20 for heat-transfer fluid. The circulation circuit 20 successively includes a heat engine 21, a first pump 22 and an electric motor 100 as previously described. All of these elements are fluidly connected in series. The first pump 22 makes it possible to cause the circulation of the heat-transfer fluid in the circulation circuit 20, from the internal chamber 10 of the electric motor 100 towards the heat engine 21 so as to perform a heat exchange. The heat-transfer fluid cools the electric motor 100 when it is in operation and then transfers the stored heat energy to the heat engine 21.

In parallel and according to the arrangement illustrated in FIG. 5, the drive system 200 also comprises a refrigerant circuit 23 in which a refrigerant liquid of the electric motor 100 is intended to circulate. The refrigerant circuit 23 successively includes the electric motor 100, a second pump 24 and a heat exchanger 25 fluidly connected in series. The refrigerant liquid circulating in the internal channel 12 of the electric motor 100 may be cooled in the heat exchanger 25 thanks to the action of the second pump 24 used to cause the circulation of the refrigerant liquid. When the invention is applied to light or heavy vehicles, the heat exchanger 25 is a radiator commonly used in the field. The refrigerant liquid is cooled by the air encountered during vehicle circulation.

As represented in FIG. 5, the refrigerant circuit 23 and the circulation circuit 20 for the heat-transfer fluid are configured so that the circulation direction of the refrigerant liquid is opposite to the circulation direction of the heat-transfer fluid. FIG. 4 illustrates the heat-transfer fluid inlet 9 disposed opposite to the refrigerant fluid outlet pipe 14. Conversely, the heat-transfer fluid outlet 11 is disposed opposite to the refrigerant fluid inlet pipe 13. This configuration makes it possible to optimize the operation of the drive system 200, because it makes it possible to optimize the thermal exchange in the internal chamber 10 between the heat-transfer fluid which enters the electric motor 100 near the refrigerant liquid outlet pipe 14, i.e. where the refrigerant liquid is the warmest. Indeed, this has gained heat energy by crossing the internal channel 12, which makes the heat exchange with the heat-transfer fluid very efficient.

According to an arrangement not visible in the figures, the drive system 200 comprises a temperature sensor configured to measure the temperature of the heat-transfer fluid at the inlet of the heat engine 21. In addition, a controller provided at the first pump 22 makes it possible to communicate with the temperature sensor to pilot the operation or stopping of the first pump 22.

The controller may in particular control the starting of the first pump 22 to cause the circulation of the heat-transfer fluid in the circuit 20 and in the internal chamber 10 when the temperature of the heat-transfer fluid measured at the inlet of the heat engine is lower than a predetermined threshold temperature value, chosen so as to optimize the operation of the heat engine 21.

Conversely, the controller may control the stopping of the first pump 22 so as to stop the circulation of the heat-transfer fluid in the internal chamber 10 when the temperature of the measured heat-transfer fluid is greater than a predetermined threshold temperature value, and which would risk reversing the heat exchange with the electric motor 100. The heat-transfer fluid could indeed heat the motor 100 instead of participating in its cooling if its temperature became too high.

According to an example of application of the invention in which the drive system 200 is used for driving a motor vehicle, the controller is advantageously used to trigger the first pump 22, thanks to the results of the temperature measurements carried out by the temperature sensor. Indeed, when the vehicle is started, the heat engine 21 is cold. However, it is known that launching the heat engine 21 when cold generates many more polluting particles, including $CO_2$. Moreover, its operation is also not optimal at low temperatures. Thus, the controller is configured so as to control the starting of the first pump 22 when the temperature of the heat-transfer fluid measured by the probe at the inlet of the heat engine 21 is below the predetermined threshold temperature, for example 90° C. The first pump 22 allows the circulation of the heat-transfer fluid (herein engine lubricating oil) in the internal chamber 10 of the electric motor 100 which heats up with the increase in the internal temperature of the active parts (rotor and stator). When the controller receives the temperature measurement and the comparison with the predetermined threshold temperature indicates that the temperature of the heat-transfer fluid is equal to or greater than approximately 90° C., the controller gives the instruction to stop the first pump 22. The heat engine 21 is then in better conditions for its start-up and then enters its standard operation, commonly used on current heat engines present on the automotive market. The electric motor 100 still operates (in the same operating modes of a traction motor) and is cooled by its own glycol circuit 23.

This exemplary application of a heat engine 21 is advantageously provided to limit the emission of $CO_2$ from a cold engine by warming up the lubricating oil before starting it. Other examples of applications may find a benefit in optimal management of the temperature and the operation of heat engine and electric motor as well as the pollution emitted.

Thus, the present invention makes it possible to improve the cooling of an electric motor 100 in operation by a heat exchange organized in an internal chamber 10 that is easy and inexpensive to manufacture. In addition, this heat exchange may be used for heat transfer to a device that needs to be heated by creating a fluid circuit for a heat-transfer fluid between the refrigerant fluid outlet and the inlet of the device to be heated. The figures illustrate an application for heating the lubricating oil of a heat engine 21 but this system may find other applications, in particular for heating the lubricating oil of a gearbox or even for the management of the temperature (heating/cooling) of the batteries, thermal capacitors, etc . . . without departing from the scope of the invention, the invention is obviously not limited to the configuration of the invention as described above.

The invention claimed is:

1. A drive system comprising a circulation circuit for a heat-transfer fluid including successively:

a heat engine, a first pump,
an electric motor comprising:
- a rotor whose rotating shaft extends along an axis of extension,
- a stator disposed around the rotor,
- a front bearing and a rear bearing configured to be assembled by forming an internal cavity in which the rotor and the stator are housed, the front bearing comprising a cylindrical portion extending along the axis of extension, and
- a lid having a bell shape that completely covers the rear bearing and at least the cylindrical portion of the front bearing, the lid comprising an internal chamber which extends at least partly around the internal cavity, a heat-transfer fluid inlet and a heat-transfer fluid outlet fluidly connected to the internal chamber so as to allow the circulation of a heat-transfer fluid in the internal chamber, fluidly connected in series, the first pump being configured to cause the circulation of the heat-transfer fluid in the circulation circuit from the internal chamber of the electric motor to the heat engine so as to perform a heat transfer from the electric motor to the heat engine in order to transfer heat energy from the electric motor to the heat engine thanks to the heat-transfer fluid, and a refrigerant circuit for the circulation of a refrigerant liquid including successively:
- the electric motor, wherein the lid is configured to form with the cylindrical portion at least one internal channel extending at least partly around the internal cavity and configured for the circulation of a refrigerant liquid,
- a second pump, and
- a heat exchanger configured to cool a refrigerant fluid, fluidly connected in series, the second pump being configured to cause the circulation of the refrigerant liquid in the refrigerant circuit from the heat exchanger to the internal channel in order to cool the electric motor.

2. The drive system according to claim 1, comprising a temperature sensor configured to measure the temperature of the heat-transfer fluid at the inlet of the heat engine, and wherein the first pump comprises a controller configured to communicate with the temperature sensor, and pilot:
- the starting of the first pump so as to cause circulation of the heat-transfer fluid in the internal chamber when the temperature of the heat-transfer fluid measured by the temperature sensor is lower than a predetermined threshold temperature value so as to heat the heat engine, and
- the stopping of the first pump so as to stop the circulation of the heat-transfer fluid in the internal chamber when the temperature of the heat-transfer fluid measured by the temperature sensor is greater than a predetermined threshold temperature value.

3. The drive system according to claim 1, wherein the refrigerant circuit and the heat-transfer fluid circulation circuit are configured so that the circulation direction of the refrigerant liquid is opposite to the circulation direction of the heat-transfer fluid.

4. The electric motor according to claim 1, wherein the heat-transfer fluid is a lubricating oil such as a heat engine oil or a gearbox oil.

5. The electric motor according to claim 1, wherein the internal chamber is cylindrical.

6. The electric motor according to claim 1, wherein the internal chamber and the internal channel are coaxial.

* * * * *